Dec. 31, 1929.      W. S. NAYLOR      1,741,476
DISPENSING AND MEASURING DEVICE
Filed June 13, 1928
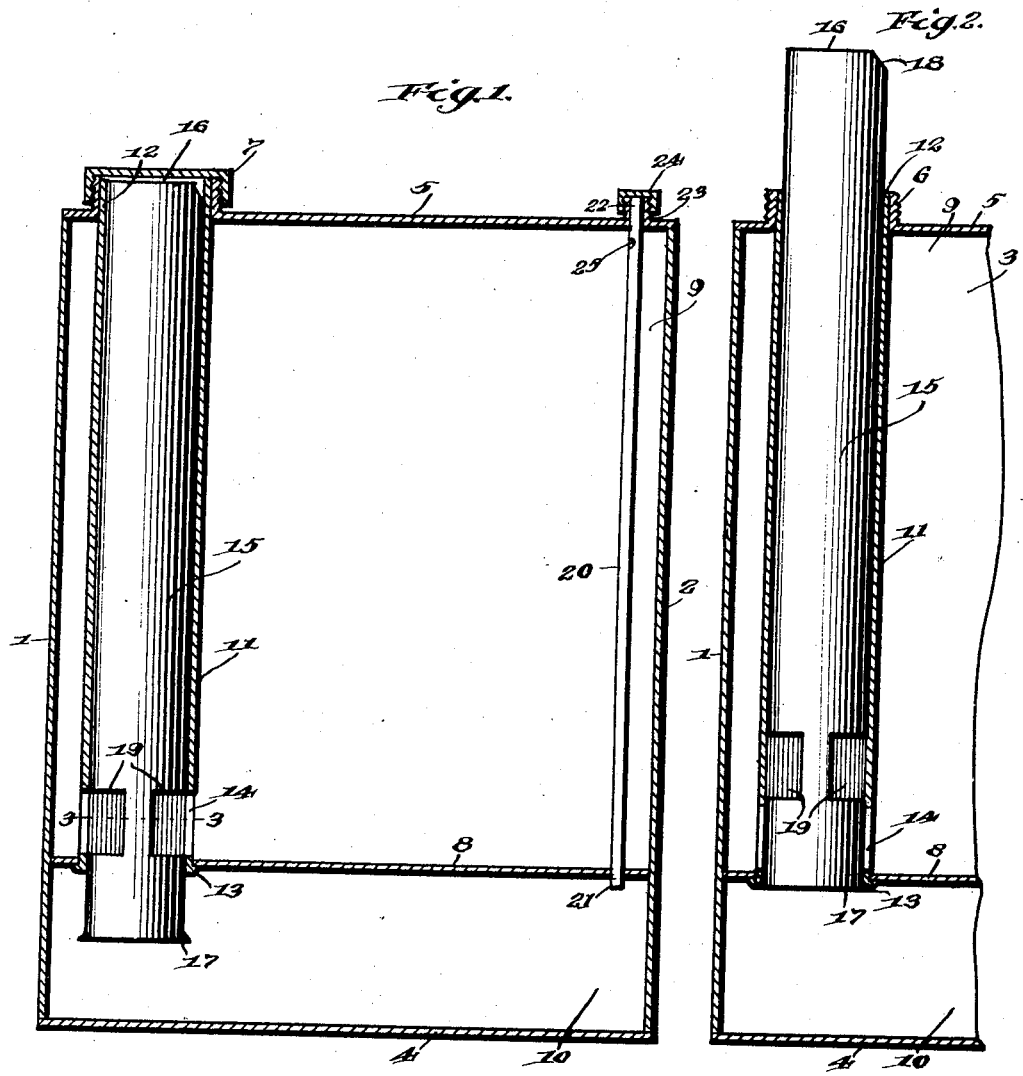
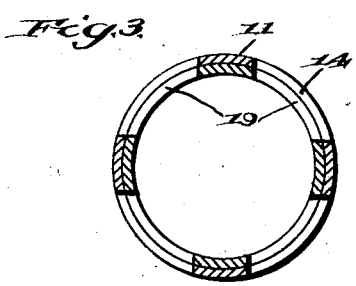
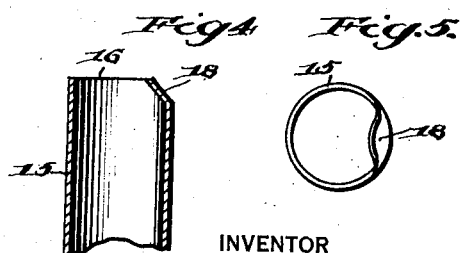
INVENTOR
William S. Naylor
BY
Carl H. Crawford
ATTORNEY Patented Dec. 31, 1929

1,741,476

UNITED STATES PATENT OFFICE

WILLIAM S. NAYLOR, OF SPOKANE, WASHINGTON

DISPENSING AND MEASURING DEVICE

Application filed June 13, 1928. Serial No. 285,137.

The object of this invention is to provide a novel form of dispensing and measuring device for liquids.

The device of my invention is more especially addressed to containers for oil and is particularly designed for use by automobile owners who do their own servicing. The device will enable such a user to measure out a fixed quantity of oil for his car without the necessity of measuring receptacles which latter not only clutter up the premises but require the initial pouring of oil for measurement and the subsequent pouring of the measured oil into the car.

One of the features of my invention resides in a container having what I will term a combined pouring and filling tube.

A further feature resides in means for dividing off the container into measuring and reservoir compartments and the disposition of means coacting with the pouring and filling tube for either establishing or shutting off communication between said compartments.

It is a feature of my invention to provide a combined pouring and filling tube that is adjustable, and which is provided with an opening whereby in one adjustment, the compartments are placed in communication with each other to fill the measuring compartment from the reservoir compartment, and which in another position of adjustment will permit of pouring off the contents of the measuring compartment while the latter is not in communication with the reservoir compartment.

My invention has many other features and objects which will be more fully described in connection with the accompanying drawing and which will be more particularly pointed out in and by the appended claims.

In the drawing;

Fig. 1, is a sectional view of the device of my invention with the container closed and the tube in an adjustment to establish communication between the adjacent compartments.

Fig. 2, is a fragmentary sectional view with the container in an open condition and the tube adjusted for pouring out a measured portion of the contents.

Fig. 3, is a sectional view on line 3—3 of Fig. 1.

Fig. 4, is a vertical sectional view of the upper end of an improved filling tube.

Fig. 5, is a top plan view thereof.

Like characters of reference designate similar parts throughout the different figures of the drawing.

In the specific form shown, my device consists of a container which may, for example, be a five gallon capacity container which is one of the standard sizes for lubricating oil. Said container has the usual vertical walls 1, 2 and 3, and bottom and top walls 4 and 5, respectively. The top wall 5 is shown provided with what is the usual filling and pouring nipple 6, which may be exteriorly threaded if the usual screw cap closure 7 is employed, although any type of closure will be serviceable. The interior of the container is partitioned off with a diaphragm 8 into superposed reservoir and measuring compartments or chambers 9 and 10, respectively. In the present form, I have disposed said partition 8 in a manner to give the chamber 10 approximately the capacity of a gallon of oil, and hence the upper reservoir chamber is larger in size than the lower measuring chamber and can empty its contents into the latter by gravity.

The device of my invention includes tube guiding means which, in the present form, also functions to prevent leakage when pouring. As shown, said means is in the form of a sleeve 11, which is advisedly disposed near one corner portion of the container, if the latter is rectangular in cross section, or near the periphery if the container is cylindrical. In the present form I have shown the upper end 12 of sleeve 11 disposed in and secured to the interior of nipple 6, in a liquid tight connection so that no leakage can occur when pouring. The lower end 13 of sleeve 11 is shown secured or crimped to the diaphragm 8. However, in the absence of positive leakage prevention, or the employment of other means therefor, said sleeve, in its primary coaction with the tube to be described, need not extend to top 5.

A feature of the sleeve 11 is the provision therein of a passage opening, and as shown, for purposes to be later described, I prefer to provide a plurality of said openings as designated at 14, and which are circumferentially spaced about the sleeve 11, as shown. Further, said opening or openings are disposed as low in the chamber 9 as possible, to drain off the contents of the latter, and I preferably dispose said openings as close as possible to diaphragm 8.

Reference will next be made to my improved and combined pouring and filling tube.

Said filling tube is designated at 15, and the same is slidably disposed in sleeve 11 to fit the latter with such a working clearance as to permit the tube 15 to be relatively freely adjusted in said sleeve. Such adjustment of course will always be facilitated by the lubrication provided by the oil contents. In the present construction, said tube 15 is of greater length than the sleeve 11 and it is proportioned so that when in a retracted position of adjustment, as shown in Fig. 1, the upper end 16 of tube 15 will be substantially flush with the top of nipple 6. The lower end 17 projects slightly below partition 8. By this arrangement, it will be clear that the closure 7, may not only be applied to nipple 6, but it will, when so applied, perform the dual function of closing said nipple and the tube 15 and resultantly the container. As a simple and novel means of providing a finger grip, I indent a portion of the upper edge 16 of tube 15, as shown at 18, so that by applying pressure under the latter, the tube 15 may be longitudinally adjusted from the Fig. 1, to the Fig. 2, position.

Said tube 15 is provided with means such as an opening or as shown a series of circumferentially disposed openings 19 in the wall of tube 15, adapted to communicate with chamber 9, and specifically to register with openings 14 when it is desired to establish communication between chambers 9 and 10, as will be seen in Fig. 1. Said openings are so disposed that they will register when the tube 15 is in a retracted position. The tube 15 has a sufficient imperforate lower portion to close openings 14 when the tube 15 is in a projected position, as shown in Fig. 2.

An air vent is provided by means in the form of a small pipe 20, the lower end 21 of which opens to chamber 10, at a point remote from tube 15. The upper end 22, is fitted and may be secured in a nipple 23, provided with a suitable closure 24. An opening 25, in pipe 20, affords air vent from chamber 9.

I will next describe the operation of the device of my invention.

In the Fig. 1 adjustment, it will be seen that the tube 15 is in a position to cause the contents to be free to flow by gravity from the chamber 9 to chamber 10, until the latter is filled. Thus, whenever the user adjusts the tube 15 so that he can apply the closure 7 to nipple 6, he will know that he has incidentally disposed the tube 15 in a position to fill chamber 10. In this position, if the container were empty, the user could remove closure 7, and fill the entire container through the tube 15. In so doing, he would of course loosen the closure 24 for air ventage. It will be further seen that in this position of the parts, the container could be used in its ordinary capacity for filling or emptying, in the absence of the measuring feature.

As shown in Fig. 2, I have converted said device into a measuring dispensing device as the tube 15 has been withdrawn so that the upper end 16 is in projecting relation to the top 5 and this longitudinal adjustment has elevated the openings 19 out of registry with openings 14. It will be noted that the edge of the lower end 17 is slightly flared so that a stop will be provided to limit upward adjustment of tube 15. No stop is necessary to limit lower adjustment of said tube as the latter will always be in a proper lower position when the upper edge 16 is flush with nipple 6, or the upper edge of the latter.

Now in the pouring adjustment shown in Fig. 2, it will be seen that projection of the tube 15 affords a pouring outlet that is so free and clear from the top of the container that the latter need never get mussy from drippings. It will be further noted that by providing a series of openings 14 and 19, I am always sure of registry without the necessity of providing means for preventing tube 15 from rotative movement in sleeve 11.

Thus, in the Fig. 2 position, the container can be tilted so as to pour out all the contents of chamber 10, thereby measuring off an approximately definite quantity of oil, say, a gallon. In this position, the means or sleeve 11, irrespective of whether it extends as far as shown, coacts with the tube 15 to shut off communication between chambers 9 and 10 to permit the whole contents of the latter to be poured off. However, the liquid tight connection of both ends of sleeve 11, as shown, is a very material advantage as it effectually prevents leakage out through nipple 6, when pouring, and it also prevents leakage from chamber 9 to 10.

It will be clear that when the tube 15, is in the Fig. 1 adjustment, the level in the tube will be the same as the level in the chamber 9, which, of course, would involve in actual measurement a slight excess over a gallon, or a variable quantity in excess of the contents of chamber 10. However, the device of my invention is not designed as an accurate measuring device such as would be necessary in selling a liquid product such as oil. It is designed for private users to provide a cheap and advantageous means of roughly measuring off approximately a given quantity of liquid. If desired, the chamber 10, might be proportioned to contain slightly less than a gallon to thereby roughly overcome the extra quantity of liquid that is always present in tube 15. However, this excess in tube 15, would, in practice, merely amount to a pint or a fraction thereof, dependent upon the size of tube 15, and for the purposes of this device, such excess would not be objectionable.

It will be seen that in one single vent pipe, I have provided means for venting both chambers.

It is believed that the device of my invention will be fully understood from the foregoing description, and while I have herein shown and described one specific form of the invention, I do not wish to be limited thereto except for such limitations as the claims may import.

I claim:

1. In a liquid dispensing and measuring device, a container having a top and bottom, a false bottom therefor dividing said container into a relatively small lower measuring compartment and a relatively large upper reservoir compartment, said top having a nipple adapted to receive a closure, a sleeve having its upper end secured in said nipple and its lower end secured in said false bottom and being provided with a passage opening near said false bottom adapted to establish communication between said compartments, and a combined filling and pouring tube longitudinally slidable in said sleeve and having a filling opening adapted to register with said passage opening, the upper end of said tube being substantially flush with the top of said nipple when said openings are in registry to fill said measuring compartment whereby a closure may be applied to said nipple to seal said container and close said tube, said tube being withdrawable into projecting relation from said nipple to dispose said openings out of relative registry and convey the contents of said measuring compartment when the container is tilted into a pouring position.

2. In a liquid dispensing and measuring device, a container having a top and bottom, a false bottom dividing said container into measuring and reservoir compartments, a sleeve opening to said measuring compartment and through the top of said container and having a passage opening, and a combined filling and pouring tube having a filling opening adapted to be disposed into or out of registry with said passage opening dependent upon the position to which said tube is longitudinally adjusted in said sleeve to either pour from said measuring compartment or fill the latter from said reservoir compartment.

3. In a convertible dispensing and measuring device, a manually portable and invertible container having a top and bottom, a false bottom dividing said container into superposed reservoir and measuring compartments, an adjustable combined filling and pouring tube opening to the outer air through the top of said container and communicating with said measuring compartment and having an opening therein adapted to communicate with said reservoir, and means coacting with said tube and the opening therein for shutting off communication between said compartments through said tube when said tube is in one adjustment, or opening communication through said tube and opening between said compartments when said tube is in another adjustment, whereby said container can either be used as a measuring or as an ordinary container.

4. In a dispensing and measuring device, a manually portable and invertible container having a top and a bottom, a false bottom dividing said container into reservoir and measuring chambers, and an adjustable tube opening to the outer air through said top and communicating with said measuring chamber and having means for establishing communication between said chambers through said tube when said tube is in one position of adjustment.

5. In a dispensing and measuring device, a manually portable and invertible container structure having a top and bottom, a false bottom dividing off said container into reservoir and measuring compartments, a combined filling and pouring tube adjustable in said container and opening to the outer air through said top and communicating with said measuring chamber or compartment, and said tube and container structure having coacting means for establishing communication between said compartments when said tube is in one position of adjustment and shutting off communication between said compartments when said tube is in another position of adjustment.

6. In a dispensing device for liquids, a container having a top and bottom, a false bottom dividing off said container into reservoir and measuring compartments, an adjustable tube opening through said top and communicating with said measuring compartment, a sleeve having its lower end secured to said false bottom and guiding said tube, and said tube and sleeve each having a series of circumferentially disposed openings above said false bottom and within said reservoir compartment to insure registry when said tube is in one position irrespective of the rotative position of said tube in said sleeve.

In witness whereof, I have hereunto set my hand.

WILLIAM S. NAYLOR.